United States Patent [19]
Scigliano

[11] 3,848,570
[45] Nov. 19, 1974

[54] RECEPTACLE-BIRD FEEDER
[76] Inventor: Robert E. Scigliano, 176 Vinal St., Revere, Mass. 02151
[22] Filed: Apr. 10, 1973
[21] Appl. No.: 349,797

[52] U.S. Cl.............................................. 119/51 R
[51] Int. Cl............................................. A01k 5/00
[58] Field of Search................ 119/51 R, 52 R, 63; 229/17 B

[56] References Cited
UNITED STATES PATENTS

| | | | |
|---|---|---|---|
| 851,320 | 4/1907 | Rogers | 119/70 |
| 1,144,157 | 6/1915 | Stroup | 119/52 R |
| 2,116,699 | 5/1938 | Hall | 119/54 |
| 2,216,511 | 10/1940 | Copeman | 119/52 R |
| D194,610 | 2/1963 | Hume | D1/27 |

*Primary Examiner*—Hugh R. Chamblee
*Attorney, Agent, or Firm*—Gardner J. O'Boyle; James G. O'Boyle

[57] ABSTRACT

A receptacle for receiving waste cooking grease or suet including a container having a slotted side wall and a removable outer sleeve covering the slotted wall, the receptacle being constructed and arranged to form a bird feeder when the container is filled with cooking grease or suet, and the sleeve is removed therefrom.

5 Claims, 5 Drawing Figures

PATENTED NOV 19 1974　　3,848,570

RECEPTACLE-BIRD FEEDER

BACKGROUND OF THE INVENTION

When cooking high fat content foods, such as bacon and sausage, it is customary to save the accumulated grease in a throw-way container such as an empty coffee or beer can. The can containing the grease is usually placed in a refrigerator whereupon the grease hardens and when the can becomes filled with hardened grease, it is thrown away.

Various bird feeders have been proposed which include a receptacle for containing bird feed, the side walls of the receptacle having a plurality of slots whereby the birds gain access to the feed in the receptacle.

After considerable research and experimentation, the receptacle of the present invention has been devised to provide the two-fold function of being a container for receiving waste cooking grease and also as a bird feeder when the container becomes filled with the waste grease. The receptacle of the present invention comprises, essentially, a container having a plurality of slots formed in the side wall thereof, a removable sleeve being threaded on the outer surface of the container forming a cover for the slotted side wall. The receptacle is provided with a bail and a bird perch, whereby when the container becomes filled with waste grease, the sleeve is removed therefrom thereby uncovering the slotted side wall. The filled container can then be hung on a tree branch or other suitable support to be a bird feeder, wherein the birds have access to the grease in the container through the slots.

Figure 1:
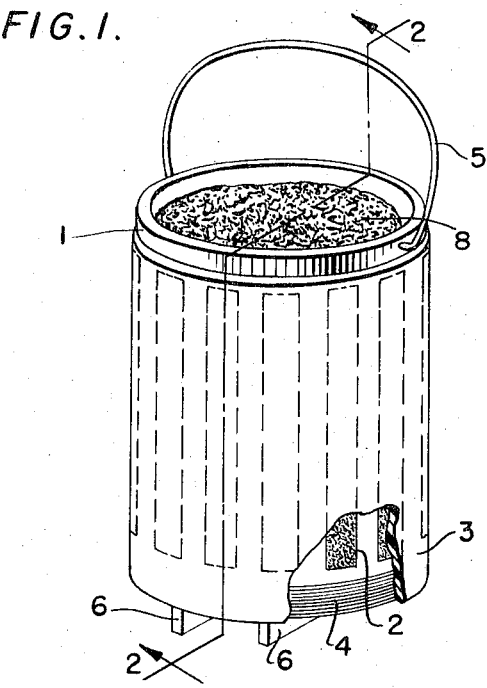
FIG. 1 is a fragmentary, perspective view of the receptacle of the present invention showing the sleeve mounted in operative position on the container.
Figure 2:
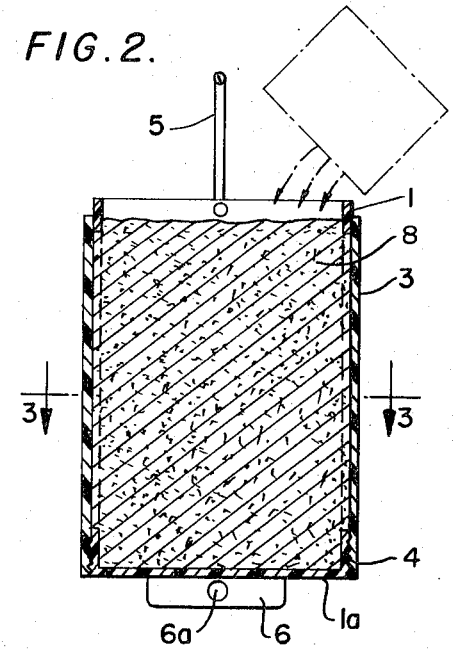
FIG. 2 is a sectional view taken along line 2—2 of FIG. 1.
Figure 3:
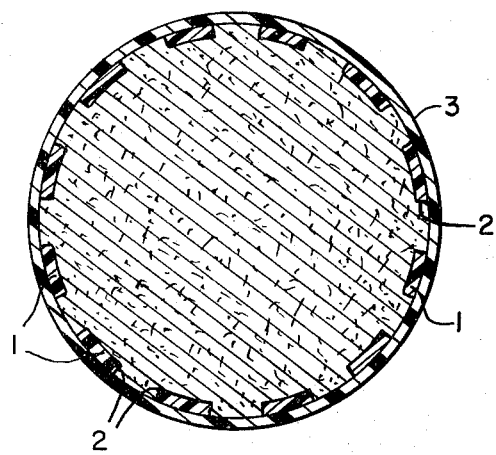
FIG. 3 is a sectional view taken along line 3—3 of FIG. 2.

Referring to the drawings and more particularly to FIG. 1 thereof, the receptacle-bird feeder of the present invention comprises a cylindrical container 1 having a plurality of circumferentially spaced, longitudinally extending slots 2 formed in the side wall thereof. An open-ended sleeve 3 is slidably mounted on the container and threadably secured thereto, as at 4, to thereby form a cover for the slots 2. The upper edge portion of the container is provided with a bail 5, and a pair of depending flanges 6 are connected to the bottom wall 1a of the container, the flanges 6 being provided with aligned apertures 6a through which a rod 7 (FIG. 4) is adapted to be inserted.

Figure 4:
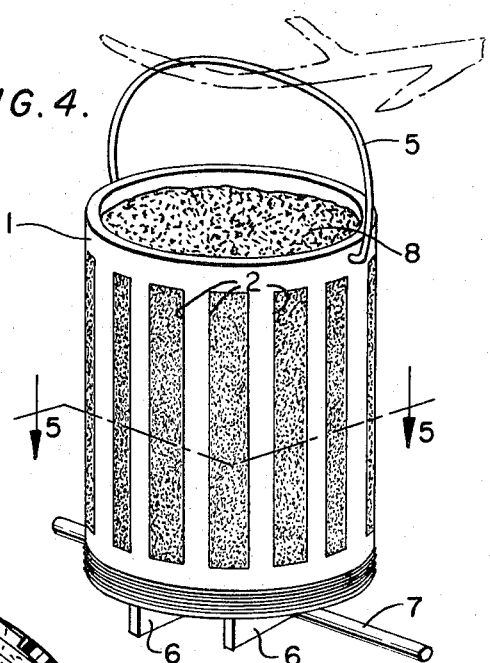
FIG. 4 is a perspective view of the container with the sleeve removed therefrom and functioning as a bird feeder.
Figure 5:
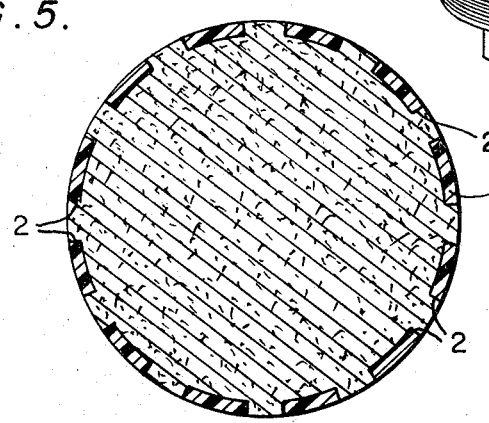
FIG. 5 is a sectional view taken along line 5—5 of FIG 4.

In using the receptacle of the present invention, waste cooking grease 8 is periodically poured into the container 1 having the sleeve 3 attached thereto until the container is filled with solidified grease. The sleeve 3 may then be removed from the container, and with the rod 7 inserted through the flanges 6 to form a bird perch, the container may be hung on a tree branch or other suitable support, as shown in FIG. 4, thereby providing a bird feeder wherein the birds have access to the grease 8 through the slots 2. If desired, a suitable closure can be provided for covering the top of the container.

It will be appreciated by those skilled in the art that the receptacle of the present invention may initially be employed as a packaged container for other commodities such as coffee. When the coffee has been expended, the receptacle can be used as a waste container for cooking grease and when the receptacle becomes filled with grease, it can be used as a bird feeder as described hereinabove. Alternatively, the receptacle of the present invention may be marketed initially as a bird feeder and the container filled with bird feed such as suet.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A throw-away type receptacle for receiving waste cooking grease or suet comprising, a container having slot means formed in the side wall thereof, a discardable sleeve mounted on the container providing a leak-proof cover for said slot means during the filling of said container, and bird perch means connected to said container, whereby after the container has become filled with solidified grease or suet, the discardable sleeve is removed therefrom to expose the contents of the can to the atmosphere through the slot means, to thereby provide a bird feeder.

2. A receptacle according to claim 1, wherein the container is cylindrical, said slot means comprising a plurality of circumferentially spaced, longitudinally extending slots, said sleeve being slidably mounted on the container side wall for covering said slots.

3. A receptacle according to claim 2, wherein said sleeve is threadably secured to the outer surface of said container.

4. A receptacle according to claim 1, wherein said bird perch means comprises a pair of depending flanges connected to the bottom wall of the container, aligned apertures formed in said flanges, and a rod extending through said aligned apertures.

5. A receptacle according to claim 4, wherein a bail is connected to the upper edge of the container whereby the container may be suspended from a tree branch.

* * * * *